(12) United States Patent
Elnozahy et al.

(10) Patent No.: US 7,093,141 B2
(45) Date of Patent: Aug. 15, 2006

(54) POWER AWARE ADAPTIVE POLLING

(75) Inventors: Elmootazbellah N. Elnozahy, Austin, TX (US); Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/324,738

(22) Filed: Dec. 18, 2002

(65) Prior Publication Data

US 2004/0123169 A1 Jun. 24, 2004

(51) Int. Cl.
*G06F 1/26* (2006.01)
*G06F 3/00* (2006.01)

(52) U.S. Cl. .................. 713/300; 713/323; 710/46
(58) Field of Classification Search ............ 713/300, 713/310, 320, 324, 185, 323; 370/318; 710/15, 710/46
See application file for complete search history.

(56) References Cited

U.S. PATENT DOCUMENTS

| | | | | |
|---|---|---|---|---|
| 5,239,652 A | * | 8/1993 | Seibert et al. | 713/323 |
| 5,327,172 A | * | 7/1994 | Tan et al. | 348/378 |
| 5,440,560 A | * | 8/1995 | Rypinski | 370/457 |
| 6,449,663 B1 | * | 9/2002 | Carney et al. | 710/15 |
| 6,640,268 B1 | * | 10/2003 | Kumar | 710/46 |
| 6,693,891 B1 | * | 2/2004 | Sugita et al. | 370/345 |
| 6,807,159 B1 | * | 10/2004 | Shorey et al. | 370/318 |
| 2002/0120852 A1 | * | 8/2002 | Krishnan et al. | 713/185 |

FOREIGN PATENT DOCUMENTS

JP  10163943 A  *  6/1998

* cited by examiner

*Primary Examiner*—Thomas C. Lee
*Assistant Examiner*—Suresh K Suryawanshi
(74) *Attorney, Agent, or Firm*—Casimer K. Salys; Jack V. Musgrave

(57) ABSTRACT

A method for adapting the periodicity of polling for pending service requests, by polling system devices for pending service requests, recording whether or not there was a pending service request and, based on accumulated data, determining whether or not the system devices are idle. Based on this determination, the system may elect to enter a power conservation mode until device activity is signaled, or an adjustable period of time elapses. The adaptation mechanism may alter the periodicity of the timer interrupt, disable or enable device interrupts, and modify variables used to determine system idleness (including minimum latency and minimum idleness thresholds). In this manner, the system can conserve power while maintaining system performance and responsiveness.

21 Claims, 6 Drawing Sheets

Power Adaptive Polling

Interrupt Driven System

POWER AWARE ADAPTIVE POLLING

BACKGROUND OF THE INVENTION

1. Field of the Invention

The present invention generally relates to computer systems, particularly to the handling of device requests, and more particularly to a method and system which handle these requests through adaptive polling in a way that maintains performance and responsiveness while conserving power consumption.

2. Description of the Related Art

A generalized client-server computing network 2 is shown in FIG. 1. Network 2 has several servers 4, 6, 8 and 9, which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at workstation clients 10. Clients 10 can also be stand-alone computer systems (like personal computers, or PCs), or "dumber" systems adapted for limited use with network 2 (like network computers, or NCs). As used herein, "PC" generally refers to any multi-purpose computer adapted for use by a single individual, regardless of the manufacturer, hardware platform, operating system, etc. A single, physical computer can act as both a server and a client, although this implementation occurs infrequently.

The information provided by a server can be in the form of programs that run locally on a given client 10, or in the form of data such as files used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature (i.e., a LAN), or can be further connected to other systems (not shown) as indicated with servers 8 and 9. The construction of network 2 is also generally applicable to the Internet.

Traditionally, general-purpose systems have been characterized by their performance. Roughly, a given system is evaluated based on the rate at which it handles specific operations. Examples include transactions-per-second, Web request-per second, and the like. Recently, power consumption has gained importance due to commercial, national and environmental concerns. It is estimated that computing systems consume about one tenth of the power generated in North America. Therefore, there is an increasing demand for power-efficient computing systems that do not compromise performance.

A general-purpose computer system (client, server or dumb device) comprises a processor, main memory and a number of devices. Several buses typically connect these components according to some well-known protocol. An example of such protocols is the Peripheral Component Interconnect (PCI). On typical general-purpose computer systems a processor handles each peripheral device request as a result of an interrupt, which originates at a device. Upon each interrupt, a context switch occurs in the processor, during which the processor state is saved to main memory and a new state is initialized to process the device request. Each such context switch incurs an excessive overhead due to the state transfers and the destructive effects on various memory caches and the resulting perturbation to the locality of memory references. Modern processors in particular have become more sensitive to this kind of overhead because of the growing gap between the processor speed and the memory access time. It is therefore detrimental to performance if a high-rate of interrupts is generated from the system devices.

Polling is an alternative method to interrupts by which the processor (CPU) may process device requests. A CPU may, for example, poll a network device to determine if there are any packets to be processed. Network appliances, including software-based switches, firewalls, proxy servers, and even first-tier web servers are increasingly making use of polled input/output (I/O) to actively coalesce interrupts, and increase overall system performance by reducing the latencies involved with context switching during interrupt handling. Polling is inefficient due to the unnecessary and continuous checking of device status when the rate of device activities such as network traffic is not relatively high. Additionally, polling is detrimental to power consumption since it occurs constantly, whether there is work to do or not, preventing the system from ever entering a "sleep" state where appropriate instructions can be issued to conserve power spent by the CPU. Thus, polling can invalidate the most fundamental power conservation strategies.

In light of the foregoing, it would be desirable to devise an improved method for managing device service requests which increases the overall system performance and responsiveness, while conserving power and enabling sophisticated power management mechanisms.

SUMMARY OF THE INVENTION

It is therefore one object of the present invention to provide an improved method of processing device service requests in a computer system.

It is another object of the present invention to provide such a method which uses polling to more efficiently handle such device service requests with high performance.

It is yet another object of the present invention to provide an improved data processing system which can adaptively poll devices to reduce power consumption without violating system responsiveness constraints.

The foregoing objects are achieved in a method for adapting the periodicity of polling for pending service requests, generally comprising the steps of polling the system devices for pending service requests, recording whether or not there was a pending service request and, based on accumulated data, determine whether or not the system devices are sufficiently idle. Based on this determination, the system may elect to enter a power conservation mode until device activity is signaled, or an adjustable period of time elapses. In this manner, the system can conserve power while maintaining system performance and responsiveness. The minimum percentage of idle time may be adaptively set, as may be the minimum latency constraint and the periodicity of the timer interrupt. Operation of the processor is resumed after the power conservation in response to a later interrupt, either a timer interrupt or a device interrupt.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
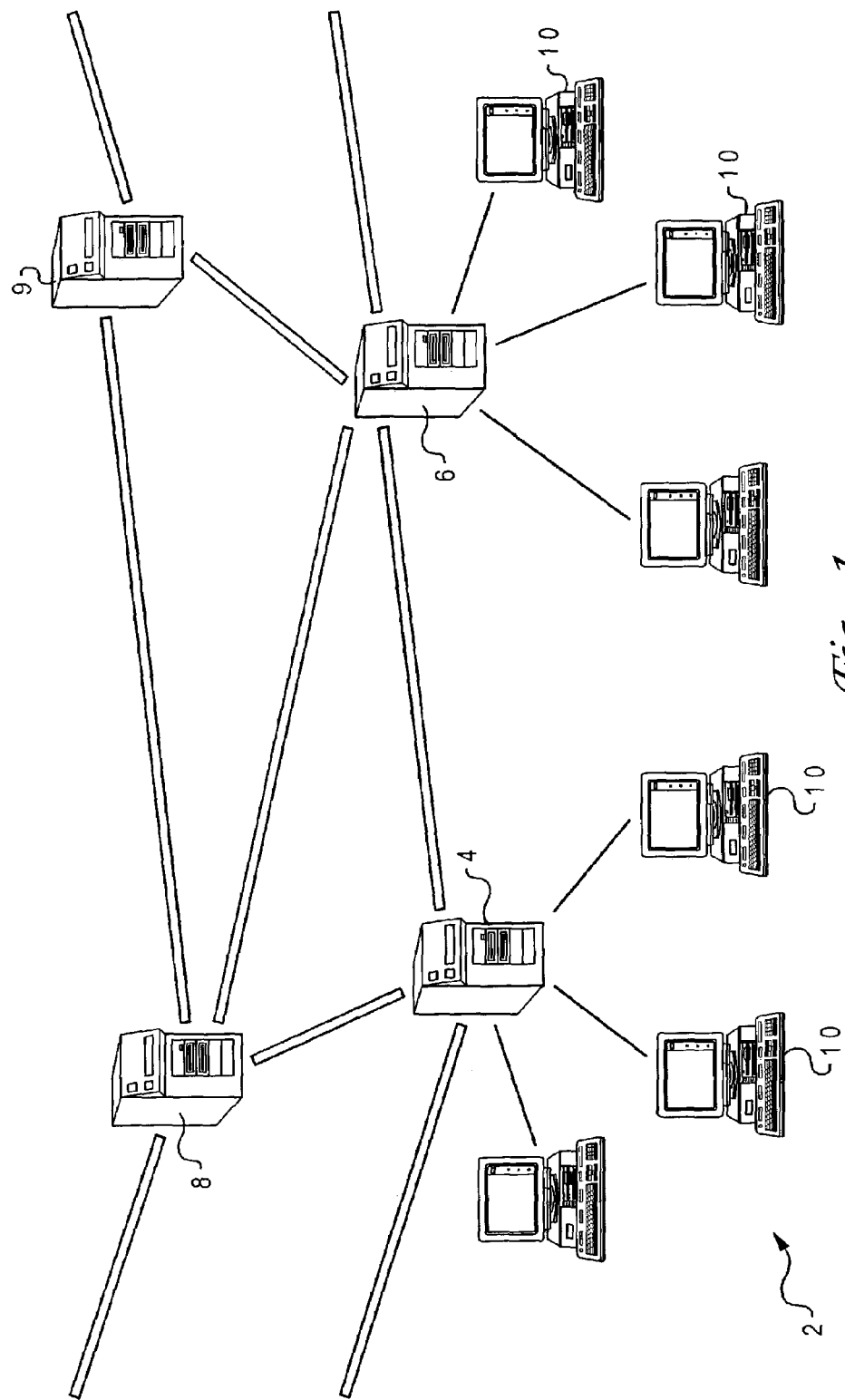
FIG. 1 is a diagram of a conventional computer network, including interconnected servers and workstation clients.
Figure 2:
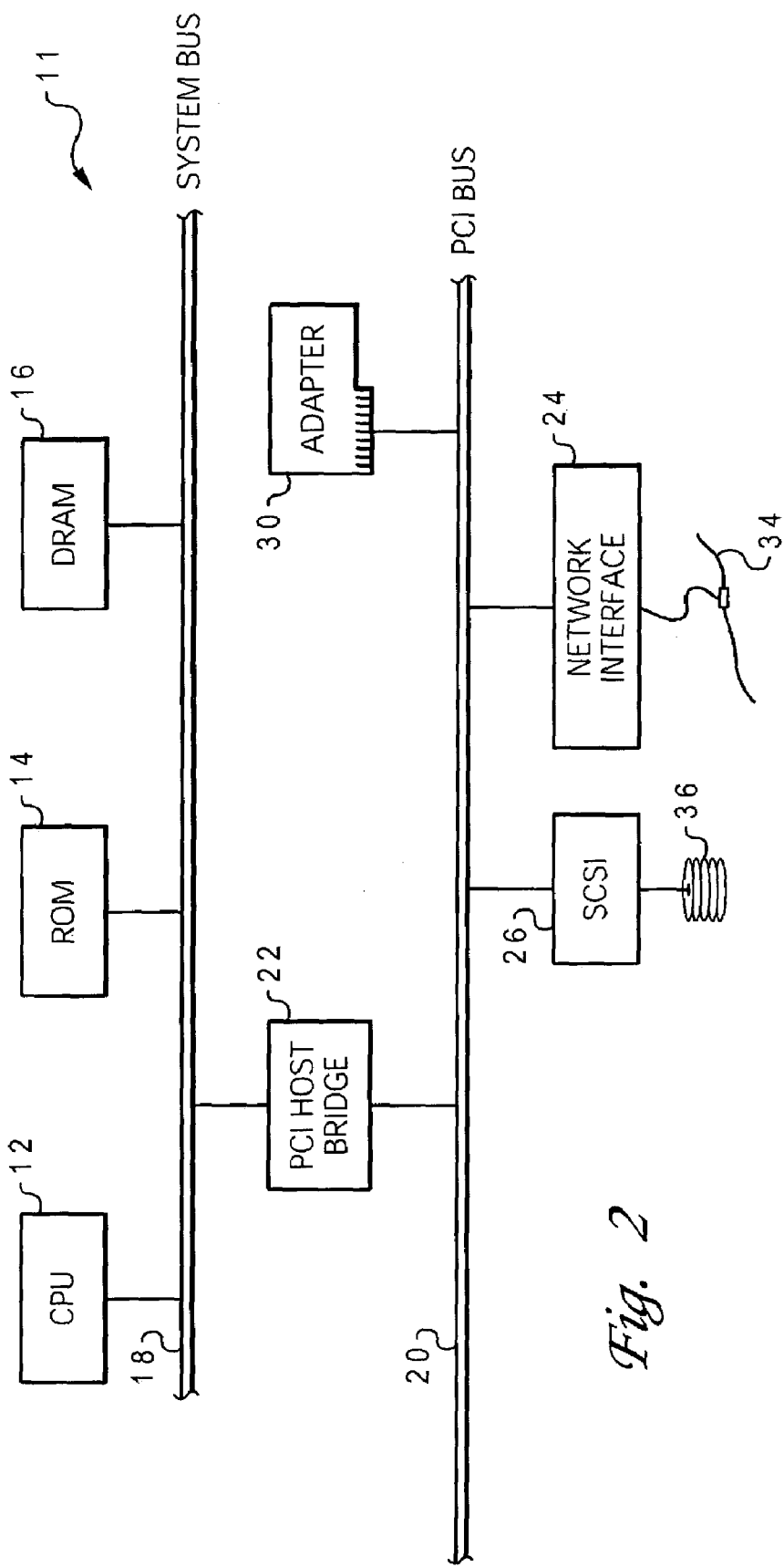
FIG. 2 is a block diagram of a data processing system programmed to carry out network communications functions in accordance with one embodiment of the present invention.

With reference now to the figures, and in particular with reference to FIG. 2, there is depicted one embodiment 11 of a data processing system programmed to carry out network communications functions in accordance with one implementation of the present invention. The invention may be applied to many different types of network appliances, such as routers, firewalls, or servers, and the following description of system 11 is somewhat generic so as to cover these and other various network devices. Additional details of system 11 will become apparent to those skilled in the art based upon the particular application.

System 11 includes a central processing unit (CPU) 12, which carries out program instructions, firmware or read-only memory (ROM) 14 which stores the system's basic input/output logic, and a dynamic random access memory (DRAM) 16 which temporarily stores program instructions and operand data used by CPU 12. CPU 12, ROM 14 and DRAM 16 are all connected to a system bus 18. There may be additional structures in the memory hierarchy, which are not depicted, such as on-board (L1) and second-level (L2) caches.

CPU 12, ROM 14 and DRAM 16 are also coupled to a peripheral component interconnect (PCI) local bus 20 using a PCI host bridge 22. PCI host bridge 22 provides a low latency path through which processor 12 may access PCI devices mapped anywhere within bus memory or input/output (I/O) address spaces. PCI Host Bridge 22 also provides a high bandwidth path to allow the PCI devices to access DRAM 16. Attached to PCI local bus 20 are a network interface adapter 24 and a small computer system interface (SCSI) adapter 26. Network interface adapter 24 may be used to connect data processing system 11 to an external computer network 34, such as a local area network (LAN) or the Internet. SCSI adapter 26 is used to control high-speed SCSI disk drive 36. Disk drive 36 stores the program instructions and data in a more permanent state, including the program that embodies the present invention as explained further below. System 11 may use more than one network interface adaptor or storage device. Other devices may also be attached to PCI bus 20 depending upon the application, as indicator with adaptor 30. For example, adaptor 30 may provide a serial interface to allow programming of system 11.

While the illustrative implementation provides the program instructions embodying the present invention on disk drive 36 (storage media), those skilled in the art will appreciate that the invention can be embodied in a program product utilizing other computer-readable media, including transmission media. In one embodiment, the computation steps of the invention may be implemented as program code using a programming language, such as C.

In the illustrative embodiment, data processing system 11 carries out program instructions for network communications, and in particular uses a novel technique to poll I/O devices (e.g., SCSI adaptor 26 or network interface 24) to manage interrupts, in a power-efficient manner. Accordingly, the program instructions may include conventional aspects of network communications functions, and these details will become apparent to those skilled in the art upon reference to this disclosure.

The present invention provides a mechanism for adaptive polling of devices, while selectively placing the CPU 12 in a power conservation state during periods of inactivity to increase power efficiency, without violating system responsiveness constraints. In the exemplary embodiment, four pieces of information are used as part of the polling infrastructure in order to implement the mechanism: whether a polling function call generated any work; how many times polled devices did not have a pending service request; how much time remains until the next timer interrupt; and what the CPU timer quanta is. Functions are provided to enable and disable interrupts to specific devices, e.g., network interface 24 or SCSI adaptor 26. The adaptation algorithm provides for a mechanism to modify the CPU timer quanta, as well as thresholds, which determine when the system is idle enough to enter into a power conservation mode.

Figure 5:
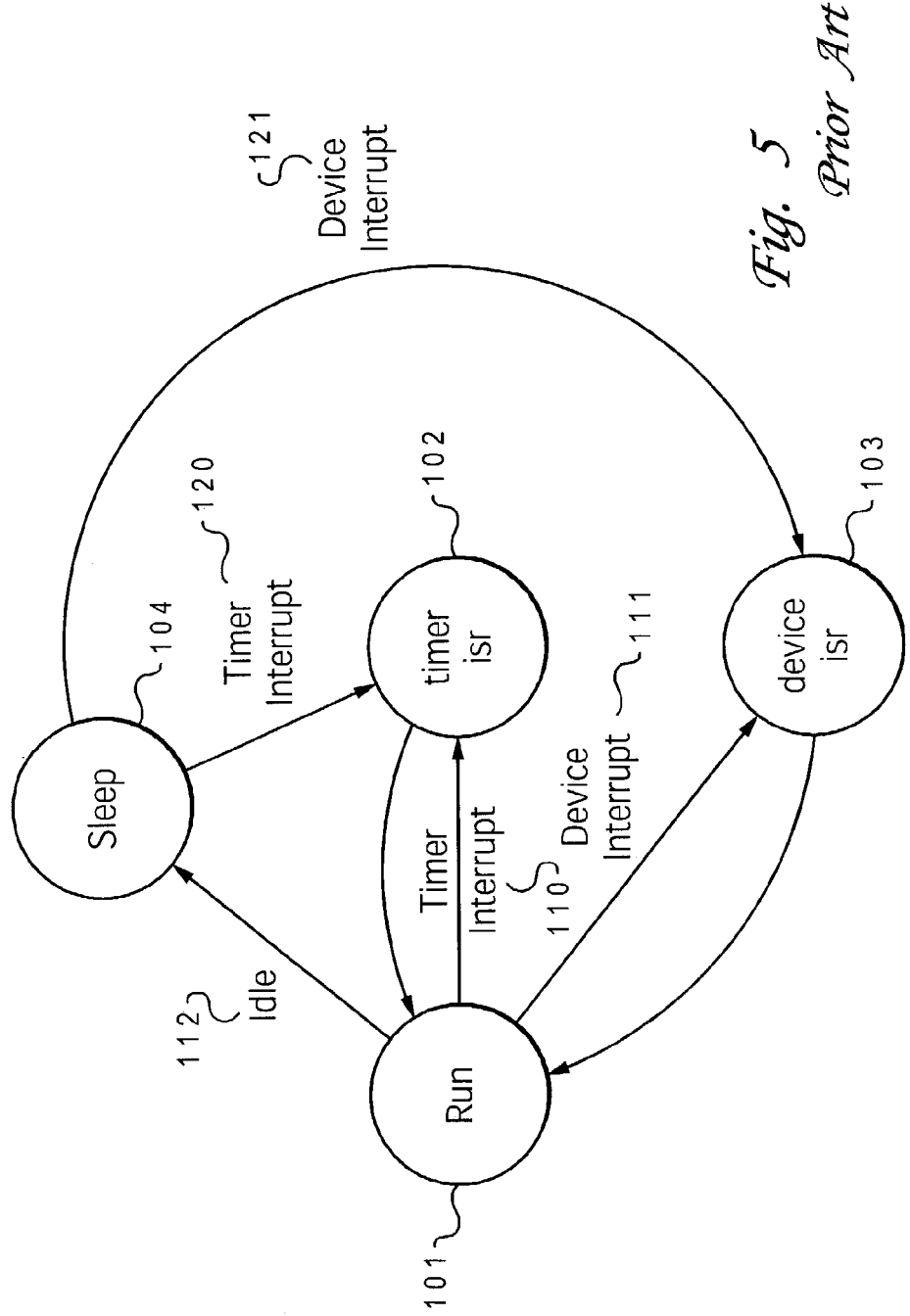
FIG. 5 is a state diagram depicting the transitions in traditional interrupt driven systems.

FIG. 5 depicts the various states associated with a prior data processing system when such a system is interrupt-driven. When the system is running applications or performing tasks within the operating system, it is considered in the Run 101 state. At regular intervals defined as a quanta, a timer interrupt is signaled. The system performs a context switch and enters the Timer Interrupt Service Routine (ISR) 102. The Timer ISR 102 is responsible for executing periodic functions and performing scheduling on multitasking operating systems. After the Timer ISR 102 completes its task, the system context is restored and control is returned to the Run 101 state.

System devices, such as a network interface or disk, trigger a Device Interrupt 111 when they experience activity that demands system attention. These interrupts can be triggered by the completion of a previously requested operation, such as a disk write or a network send, or they can be triggered by receiving new data such as receiving a new packet on the network. When such an interrupt is received, the system performs a context switch and executes the device's interrupt service routine (Device ISR 103). This routine checks the device status and performs any required operations, after which the system context is restored and control is transferred back to the Run 101 state.

When there are no applications or operating system tasks ready to run, or when all of the aforementioned tasks are blocked waiting on a system event or device I/O, the system is said to be "idle" 112, and most systems are configured to transfer to a power conservation mode, or Sleep 104 state. The system stays in this state, until an interrupt (either Timer 120, or Device 121) is received, after which control is transferred to the appropriate ISR (102 or 103). Typically, the results of either ISR will create new work for applications or the operating systems, and a return to the Run 101 state. Otherwise, if the system is still idle, it will return to the power conservation, or Sleep 104 state.

Figure 6:
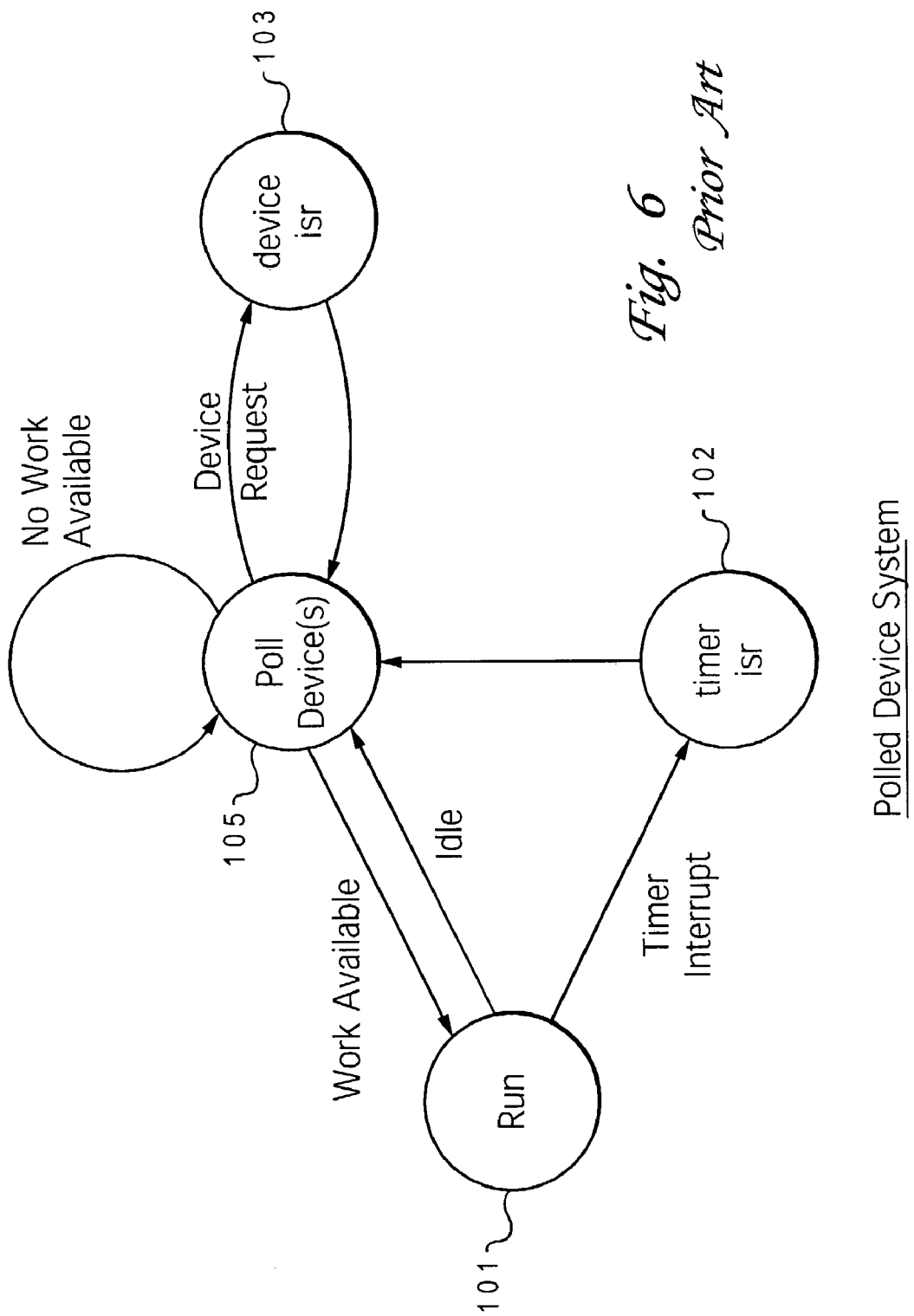
FIG. 6 is a state diagram depicting the transitions in traditional polled I/O systems.

In a polling system (FIG. 6), interrupts are not used to signal device activity. Instead, device status is periodically checked—either during a Timer ISR 102 or during an Idle Poll Loop 105. When the Poll Loop 105 detects new device activity, it calls the device's ISR. Since the system is constantly checking device status or running application or system tasks—there is no opportunity for power conservation or the transfer to a Sleep state 104. Simply sleeping when no application or system task needs to run may violate latency constraints on device service requests and cause system performance degradation.

Figure 3:
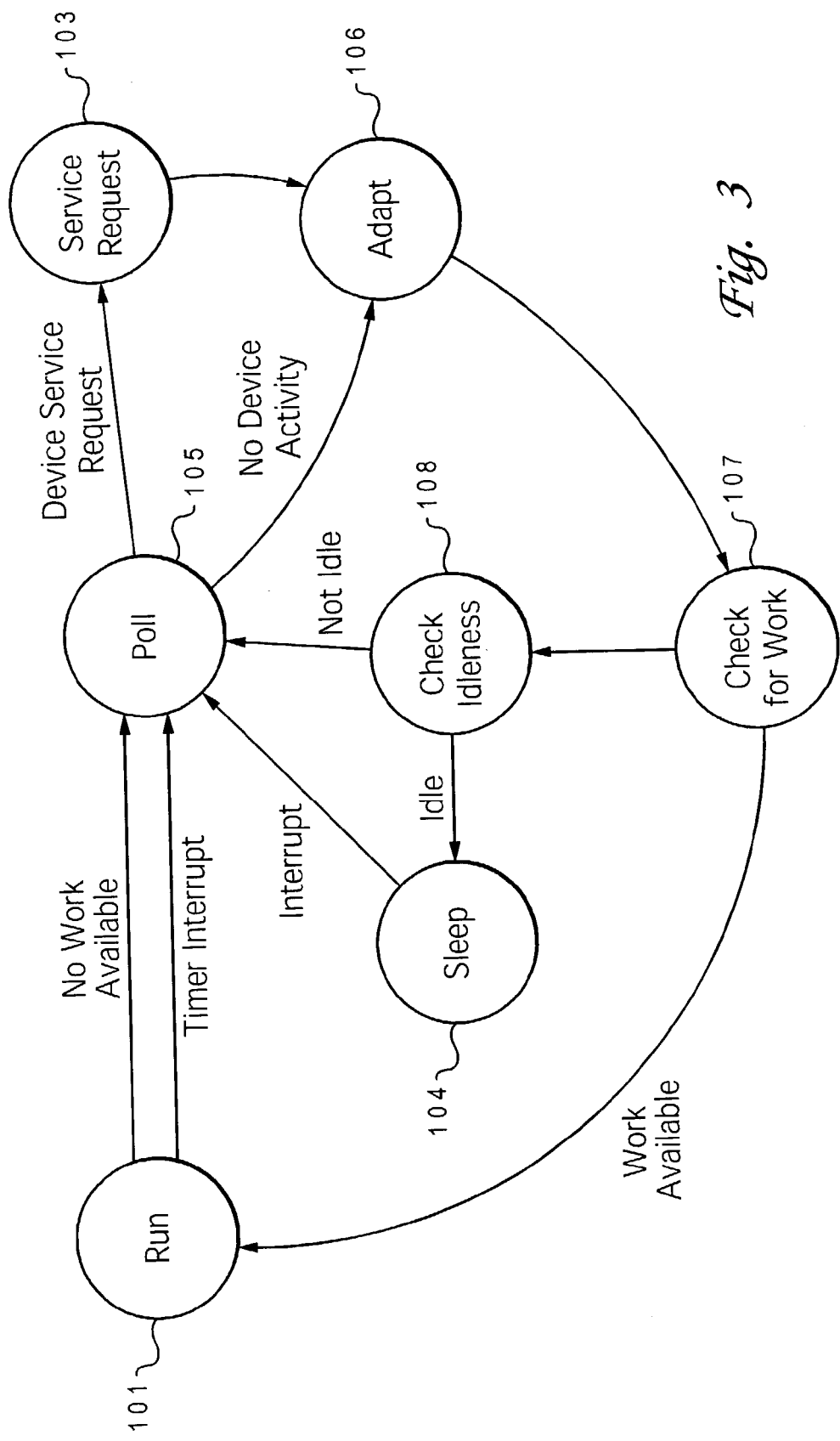
FIG. 3 is a state diagram illustrating transitions used with the data processing system of FIG. 2, in accordance with one implementation of the present invention.

FIG. 3 represents a hybrid of the two prior systems with an adaptation mechanism to adjust system power conservation without degrading system performance or responsiveness. The system starts in the Run state 101, when the system has no more application or system tasks to run or when a timer interrupt occurs the system transfers into a Poll state 105. If the poll of device status detects a service request, control is transferred the appropriate device's ISR 103. When the ISR completes, an activity counter is incremented and control is passed to an Adaptation routine 106. If no device activity is detected, an inactivity counter is incremented and control is passed to the Adaptation routine 106.

The Adaptation routine 106 may examine the system state, including inactivity and activity counters (which track how many times a polled device had no work to do or had a pending service request), and adapts system parameters to increase or decrease power conservation while maintaining system responsiveness constraints. While this Adaptation may vary from system to system, one particular embodiment may choose to declare the devices "idle," and therefore make the system eligible for power conservation, after a certain number of polls of that device's status return no activity. It may further choose to adjust the idle threshold, or the number of consecutive inactive polls before a system is considered "idle".

During periods of extended idleness (in which no device activity is detected for an entire timer quanta), the Adaptation algorithm 106 may elect to disable polling by reducing the threshold in such a way that only a single poll of device status is necessary to determine whether the device is idle, and re-enable device interrupts. This approach serves to keep the system in the sleep state as much as possible, interrupted only by device activity or timer interrupts. Any such device activity would trigger the Adaptation routine 106 to disable device interrupts and increase the threshold for inactivity.

A further embodiment may choose to adjust the period of timer interrupts (the quanta) so that they occur less frequently. Consideration of system scheduling policies and periodic tasks may provide an upper bound on this adjustment.

In order to provide for batching of service requests, the Adaptation routine 106 may further decide to declare the system idle prior to reaching an inactivity threshold, if the time until the end of the timer quanta is less than the minimum latency threshold for a service request. In a simplified example, the timer quanta for a web server blade might be set at 10 milliseconds. Eight milliseconds of polling and activity have passed since the last clock tick. If the minimum latency constraint is set at 3 milliseconds, then the CPU will be put to sleep for the remaining 2 milliseconds until the next timer tick.

After the Adaptation routine 106 runs, the system checks if system or application tasks are ready to run. If this is the case, control is passed back to the Run 101 state to execute the task(s). If no tasks are ready to run, the system checks the Adaptation parameters to see if the system is considered "IDLE". If the system is not considered idle, the Poll state 105 is re-entered to check device status. If the system has been determined to be idle and power conservation won't degrade responsiveness, then the system enters the Sleep 104 state. Interrupts (device or timer) will bring the system out of the power conservation Sleep 104 state and into the Poll state 105.

The minimum latency constraint may be hard-coded by the system designer, or may adapt over time based on feedback to meet end-to-end response time constraints of the system. The derivation of this end-to-end response time is application specification, and it can vary considerably according to the user's needs. For example, a web server on a long haul network with, e.g., a five second transmission delay can more easily tolerate a four-millisecond delay caused by power conservation. Modeling results have shown a potential power savings of 30%–40% when using Intel CPU architectures in web server blades.

Figure 4:
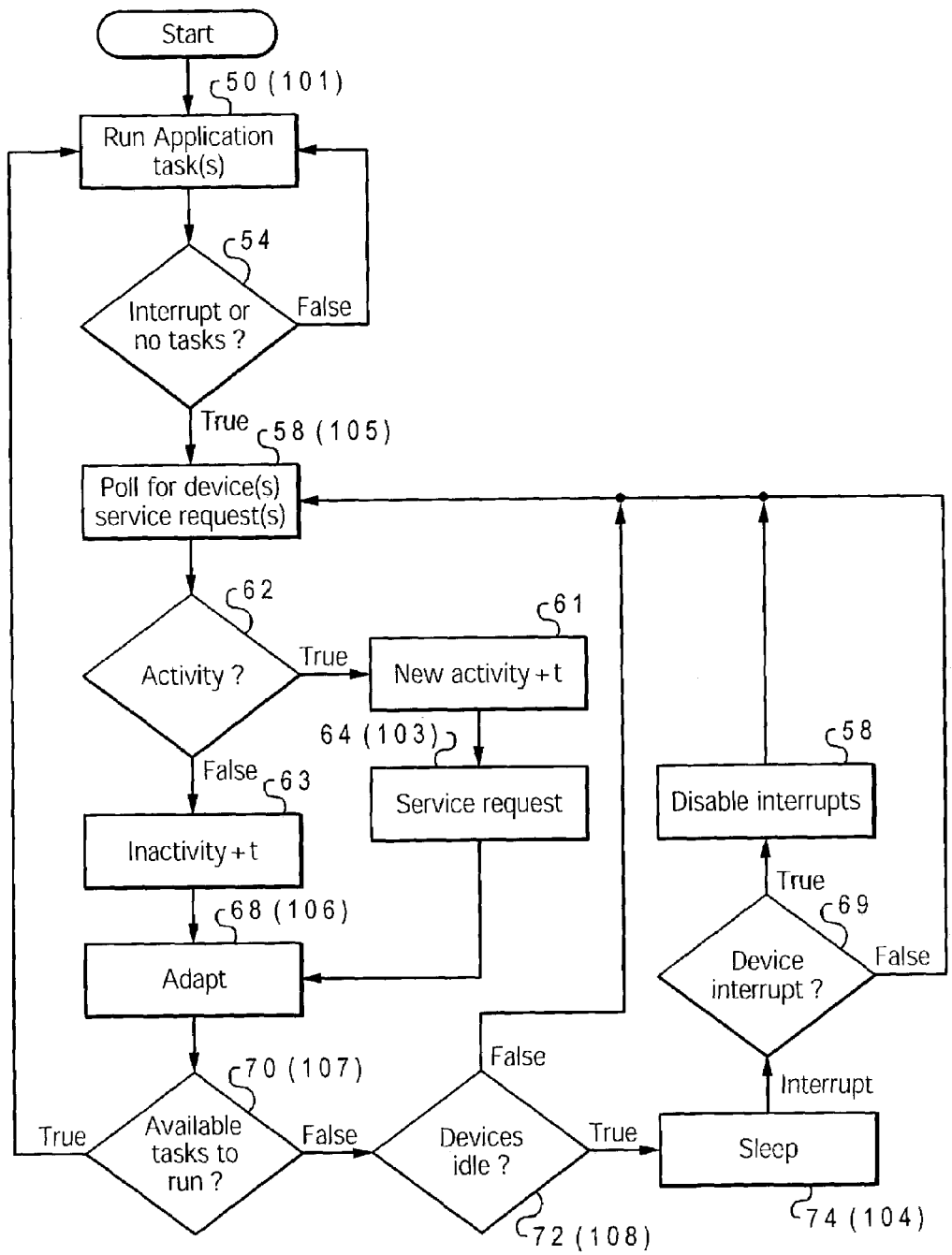
FIG. 4 is a chart depicting the logical flow for one implementation of the polling mechanism of the present invention.

The invention may be further understood with reference to the flow chart of FIG. 4, depicting the illustrative implementation. Several of the steps of FIG. 4 include a second reference numeral in parentheses which represents the corresponding functional operational states seen in FIG. 3. The process begins with running user applications (50). The system waits for an interrupt (54) or for no more application or system tasks to be ready to run. The system then polls devices to see if there is a pending service request (58). If there are pending service requests (62), the system accounts for the activity (61) and transfers to the device's interrupt service routine to handle the request (64). After processing the device's request(s), the system goes through Adaptation (68) step. If no pending service requests are detected, a system inactivity counter is incremented (63) and then the Adaptation routine (68) is run.

As previously mentioned, the Adaptation routine (68) adjusts system variables based on activity, inactivity, and/or the time remaining in the quanta. It then decides whether or not to declare the devices IDLE. If the devices are IDLE the Adaptation routine may decide to enable device interrupts. After the Adaptation routine completes, the system checks to see whether there are any application or system tasks ready to run. If so, it returns to running tasks (50). Otherwise, the system checks to see if the Adaptation has declared the devices IDLE (72). If not, the system returns to polling devices for pending service requests (58). If the devices are idle, the system is put into a power conserving state (74) which it will not leave unless it receives a timer or device interrupt.

If a device interrupt was responsible for the system leaving the power conservation state (69), device interrupts are disabled (58) and the system returns to polling for pending service requests (58).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for adapting the periodicity of polling for pending device service requests in a data processing system having a system processor and one or more input/output (I/O) devices, comprising the steps of:
    polling the I/O devices of the data processing system for pending service requests;
    recording whether there was a pending service request;
    adaptively adjusting one or more system polling variables when there is no pending service request from at least one of the I/O devices:
    based on accumulated data, determining that the I/O devices are idle; and
    in response to said determining step, placing the system processor in a low power state.

2. The method of claim 1, further comprising the step of handling one or more service requests received from said polling step.

3. The method of claim 1, wherein said adjusting adaptively sets a threshold of a minimum number of polls which do not find pending service requests before a device is considered idle.

4. The method of claim 1, wherein said adjusting adaptively sets a period of a timer quanta corresponding to how often the system processor is interrupted by a timer, in response to system and device inactivity.

5. The method of claim 1, further comprising the steps of enabling and disabling device interrupts in response to device activity and the lack thereof.

6. The method of claim 1, wherein said adjusting adaptively sets a minimum latency threshold for a maximum amount of time the system processor may stay in the low power state while there may be pending service requests.

7. The method of claim 1, further comprising the step of resuming operation of the system processor after it is placed in the low power state in response to a later interrupt.

8. A data processing system comprising:
    at least one system processor;
    a memory device connected to said system processor;
    one or more input/output (I/O) devices connected to said system processor; and
    program instructions stored in said memory device for adapting the periodicity of polling for pending service requests, by polling said I/O devices for pending service requests, recording whether there was a pending service request, adaptively adjusting one or more system polling variables when there in no pending service request from at least one of the I/O devices, based on accumulated data determining that the I/O devices are idle, and responsively placing said system processor in a low power state.

9. The data processing system of claim 8 wherein said program
    instructions further handle one or more interrupts received from the polling.

10. The data processing system of claim 8 wherein said adjusting adaptively sets a threshold of a minimum number of polls which do not find pending service requests before a device is considered idle.

11. The data processing system of claim 8 wherein said adjusting adaptively sets a period of a timer quanta corresponding to how often said system processor is interrupted by a timer, in response to system and device inactivity.

12. The data processing system of claim 8 wherein said program instructions further enable and disable device interrupts in response to device activity and the lack thereof.

13. The data processing system of claim 8 wherein said adjusting adaptively sets a minimum latency threshold for a maximum amount of time the system processor may stay in the low power state while there may be pending service requests.

14. The data processing system of claim 8 wherein said program instructions resume operation of said system processor after it is placed in the low power state in response to a later interrupt.

15. A computer program product executed in a data processing system for adapting the periodicity of polling for pending device service requests, the data processing system having a system processor and one or more input/output (I/O) devices, comprising:
    a computer-readable medium; and
    program instruction residing in said medium for polling the I/O devices for pending service requests, recording whether there was a pending service request, adaptively adjusting one or more system polling variables where there is no pending request from at least one of the I/O devices, based on accumulated data determining that the I/O devices are idle, and responsively placing the system processor in a low power state.

16. The computer program product of claim 15 wherein said program instructions further handle one or more interrupts received from the polling.

17. The computer program product of claim 15 wherein said adjusting adaptively sets a threshold of a minimum number of polls which do not find pending service requests before a device is considered idle.

18. The computer program product of claim 15 wherein said adjusting adaptively sets a period of a timer quanta corresponding to how often the system processor is interrupted by a timer, in response to system and device inactivity.

19. The computer program product of claim. 15 wherein said program instructions further enable and disable device interrupts in response to device activity and the lack thereof.

20. The computer program product of claim 19 wherein said adjusting adaptively sets a minimum latency threshold for a maximum amount of time the system processor may stay in the low power state while there may be pending service requests.

21. The computer program product of claim 19 wherein said program instructions resume operation of the system processor after it is placed in the low power state in response to a later interrupt.

* * * * *